United States Patent
Zhang et al.

(10) Patent No.: US 12,401,730 B2
(45) Date of Patent: Aug. 26, 2025

(54) MULTICHANNEL DATA TRANSMITTING METHOD AND APPARATUS, MULTICHANNEL DATA RECEIVING METHOD AND APPARATUS, MEDIUM, AND ELECTRONIC DEVICE

(71) Applicant: ZTE CORPORATION, Guangdong (CN)

(72) Inventors: Weiliang Zhang, Guangdong (CN); Liquan Yuan, Guangdong (CN); Jun Shan Wey, Guangdong (CN); Yong Guo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 214 days.

(21) Appl. No.: 17/767,893

(22) PCT Filed: Oct. 9, 2020

(86) PCT No.: PCT/CN2020/119902
§ 371 (c)(1),
(2) Date: Apr. 9, 2022

(87) PCT Pub. No.: WO2021/068877
PCT Pub. Date: Apr. 15, 2021

(65) Prior Publication Data
US 2024/0089353 A1 Mar. 14, 2024

(30) Foreign Application Priority Data
Oct. 10, 2019 (CN) .......................... 201910960282.2

(51) Int. Cl.
*H04L 69/22* (2022.01)
*H04L 5/00* (2006.01)

(52) U.S. Cl.
CPC ............ *H04L 69/22* (2013.01); *H04L 5/0053* (2013.01); *H04L 5/0058* (2013.01); *H04L 5/0094* (2013.01)

(58) Field of Classification Search
CPC ..... H04L 69/22; H04L 5/0053; H04L 5/0058; H04L 5/0094; H04L 69/324;
(Continued)

(56) References Cited

U.S. PATENT DOCUMENTS

2009/0092154 A1\* 4/2009 Malik ................. H04L 12/2861
370/480
2010/0142944 A1 6/2010 Zou
(Continued)

FOREIGN PATENT DOCUMENTS

CN 1812316 A 8/2006
CN 101299649 A 11/2008
(Continued)

OTHER PUBLICATIONS

European Patent Office, extended European Search Report dated Oct. 9, 2023, for corresponding EP application No. 20873730.4.
(Continued)

*Primary Examiner* — Mang Hang Yeung
(74) *Attorney, Agent, or Firm* — Li & Cai Intellectual Property (USA) Office

(57) ABSTRACT

The present disclosure provides a multichannel data transmitting method, including: transmitting a plurality of data units of a data packet, with the plurality of data units including a frame header data unit and a plurality of pure data units; and transmitting the frame header data unit in the plurality of data units includes: transmitting the frame header data unit on one of a plurality of channels, with identifiers of channels for transmitting the data units and initial transmitting positions of the channels for transmitting
(Continued)

the data units being indicated in the frame header data unit. The present disclosure further provides a multichannel data receiving method, a multichannel downstream superframe transmitting method, a multichannel data transmitting apparatus, a multichannel data receiving apparatus, a computer-readable storage medium and an electronic device.

20 Claims, 11 Drawing Sheets

(58) Field of Classification Search
CPC .............. H04L 5/0044; H04L 69/06; H04Q 2011/0064; H04Q 2011/0088; H04Q 11/0067; H04Q 11/0062

USPC ....................................................... 370/392
See application file for complete search history.

(56) References Cited

U.S. PATENT DOCUMENTS

| | | | |
|---|---|---|---|
| 2013/0250957 A1* | 9/2013 | Matsuoka | H04W 28/06 370/392 |
| 2014/0192808 A1 | 7/2014 | Thubert et al. | |
| 2015/0098703 A1 | 4/2015 | Wu et al. | |
| 2017/0012731 A1* | 1/2017 | Luo | H04J 14/0227 |

FOREIGN PATENT DOCUMENTS

| | | |
|---|---|---|
| CN | 101378388 A | 3/2009 |
| CN | 101674145 A | 3/2010 |
| CN | 102870434 A | 1/2013 |
| EP | 3304830 A1 | 4/2018 |
| WO | WO2010005775 A1 | 1/2010 |
| WO | WO2017008713 A | 1/2017 |

OTHER PUBLICATIONS

Weiliang Zhang ZTE China : "channel bonding efficiency and framing in G.hsp.comTC", ITU-T Draft, Oct. 17, 2019.
WIPO, International Search Report issued on Jan. 4, 2021.

* cited by examiner

MULTICHANNEL DATA TRANSMITTING METHOD AND APPARATUS, MULTICHANNEL DATA RECEIVING METHOD AND APPARATUS, MEDIUM, AND ELECTRONIC DEVICE

The present application claims priority to the Chinese Patent Application No. 201910960282.2 filed with the Chinese Patent Office on Oct. 10, 2019, the entire contents of which are incorporated herein by reference.

TECHNICAL FIELD

The present disclosure relates to the field of communication technologies, and in particular, to a multichannel data transmitting method, a multichannel data receiving method, a multichannel downstream superframe transmitting method, a multichannel downstream superframe receiving method, a multichannel data transmitting apparatus, a multichannel data receiving apparatus, a computer-readable storage medium and an electronic device.

BACKGROUND

With regard to a data transmission standard of a passive optical network, discussion is mostly focused on multichannel bonding for improving channel capacity and peak rate. Specifically, when information is transmitted, data of the information is mostly distributed on different channels. However, when the data is transmitted according to the existing transmission standard, a problem of low data efficiency occurs.

SUMMARY

In a first aspect of the present disclosure, a multichannel data transmitting method for a passive optical network is provided, and the method includes:
transmitting a plurality of data units of a data packet, with the plurality of data units including a frame header data unit and a plurality of pure data units; and transmitting the frame header data unit in the plurality of data units includes:
transmitting the frame header data unit on one of a plurality of channels, with identifiers of channels for transmitting the data units and initial transmitting positions of the channels for transmitting the data units being indicated in the frame header data unit.

In a second aspect of the present disclosure, a multichannel data receiving method is provided, and the method includes:
receiving a plurality of data units of a data packet, with the plurality of data units including a frame header data unit and a plurality of pure data units, and identifiers of channels for transmitting the data units and initial transmitting positions of the channels for transmitting the data units being indicated in the frame header data unit.

In a third aspect of the present disclosure, a multichannel downstream superframe transmitting method is provided, an information field of a downstream superframe includes an XGEM frame, and the downstream superframe transmitting method includes:
transmitting the XGEM frame with the above multichannel data transmitting method provided by the present disclosure, with the XGEM frame including a frame header data unit and a plurality of pure data units.

In a fourth aspect of the present disclosure, a multichannel downstream superframe receiving method is provided, an information field of a downstream superframe includes an XGEM frame, and the multichannel downstream superframe receiving method includes:
receiving the XGEM frame with the above multichannel data receiving method provided by the present disclosure, with the XGEM frame including a header data element and a plurality of pure data units.

In a fifth aspect of the present disclosure, a multichannel data transmitting apparatus is provided, and the apparatus includes a transmitting component configured to transmit a data packet which includes a plurality of data units including a frame header data unit and a plurality of pure data units, and the transmitting component is configured to transmit the plurality of data units, and
the transmitting component is configured to transmit the frame header data unit on one of a plurality of channels, and identifiers of channels for transmitting the data units and initial transmitting positions of the channels for transmitting the data units are indicated in the frame header data unit.

In a sixth aspect of the present disclosure, a multichannel data receiving apparatus for a passive optical network is provided, and the apparatus includes a receiving component configured to receive a data packet which includes a plurality of data units including a frame header data unit and a plurality of pure data units, the receiving component is configured to receive the plurality of data units, and identifiers of channels for transmitting the data units and initial transmitting positions of the channels for transmitting the data units are indicated in the frame header data unit.

In a seventh aspect of the present disclosure, there is provided a computer-readable storage medium having an executable program stored therein, and
when the executable program is executed by a processor, the multichannel data transmitting method described above is performed, or the multichannel data receiving method described above is performed.

In an eighth aspect of the present disclosure, an electronic device is provided, and the electronic device includes:
one or more processors; and
a storage device having one or more programs stored therein; and when the one or more programs are executed by the one or more processors,
the one or more processors perform the multichannel data transmitting method described above, or the multichannel data receiving method described above.

BRIEF DESCRIPTION OF DRAWINGS

The drawings are used to provide a further understanding of the present disclosure, constitute a part of specification, and explain the present disclosure with the following specific implementations, but do not constitute a limitation on the present disclosure. In the drawings.

DETAIL DESCRIPTION OF EMBODIMENTS

The specific implementations of the present disclosure are described in detail below with reference the drawings. It should be understood that the specific implementations described herein are merely used to illustrate and explain the present disclosure, and are not intended to limit the present disclosure.

It is found from research that the reason for low data efficiency in current data transmission is that when information formed by data is transmitted on multiple channels, after the information is divided into multiple data units, each channel expects a frame header to be added. For example, in a case where the transmitted data has a length of 64 bytes, if the data is transmitted on a single channel with a header of 8 bytes, the data efficiency is 88.98%; if the data is transmitted on two channels with the header added to each of the channels, the data efficiency is 80%; and if the data is transmitted on four channels with the header added to each of the channels, the data efficiency is 66.7%. Therefore, low data efficiency is resulted in when the data are transmitted on multiple channels.

Figure 1:
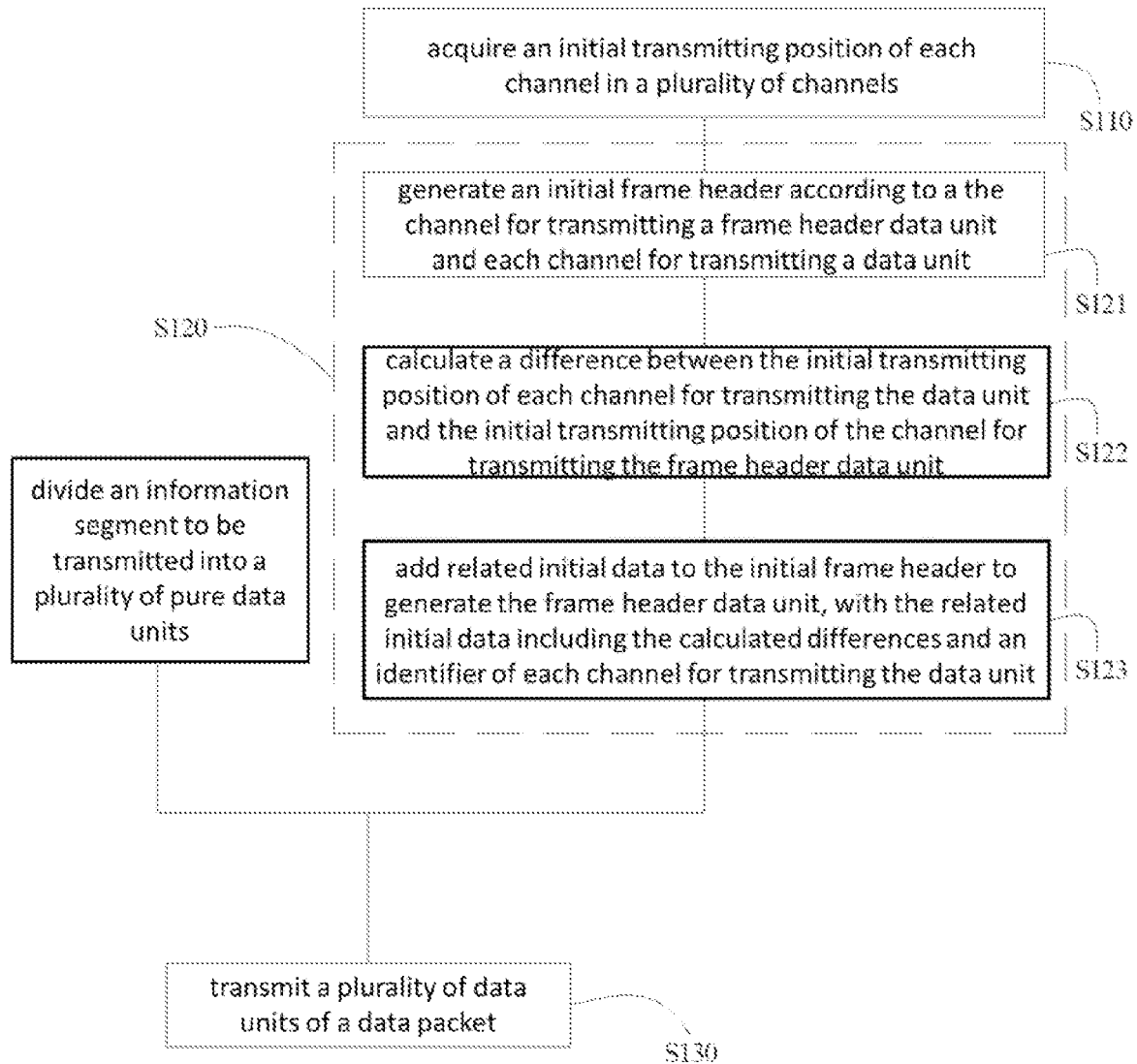
FIG. 1 is a flowchart illustrating a multichannel data transmitting method provided by the present disclosure.

In view of the above, in a first aspect of the present disclosure, a multichannel data transmitting method for a passive optical network is provided. As shown in FIG. 1, the multichannel data transmitting method includes:

operation S130, transmitting a plurality of data units of a data packet, with the plurality of data units including a frame header data unit and a plurality of pure data units, and transmitting the frame header data unit in the plurality of data units including:

transmitting the frame header data unit on one of a plurality of channels, with identifiers of channels for transmitting the data units and initial transmitting positions of the channels for transmitting the data units being indicated in the frame header data unit.

It should be noted that the multichannel data transmitting method provided by the present disclosure is applied to a transmitting terminal. When the multichannel data transmitting method provided by the present disclosure is used to transmit information (may be a paragraph of text, a picture, a mail, etc.), each data packet includes one frame header data unit, that is, one of the plurality of channels for transmitting data is added with a frame header, instead of adding a frame header to each channel in the existing art, thereby improving the data efficiency during data transmission.

For example, in a case where the transmitted data has a length of 64 bytes, if the data is transmitted on two channels, and a header of 8 bytes is added, and thus the data efficiency is 88.98%, which is considerably improved over 80% in the existing art. In a case where the transmitted data has a length of 64 bytes, if the data is transmitted on four channels, and a header of 8 bytes is added, and thus the data efficiency is 88.98%, which is improved over 66.7% in the existing art more significantly.

Since the identifiers of the channels for transmitting the data units and the initial transmitting positions of the channels for transmitting the data units are indicated in the frame header data unit, a receiving terminal can analyze the frame header data unit when receiving the data, to obtain information of other channels for transmitting the data units, and assemble the data units transmitted by all the channels according to the obtained information, thereby obtaining correct information.

In the present disclosure, a type of a network where the multichannel data transmitting method is applied is not particularly limited, for example, the multichannel data transmitting method provided by the present disclosure may be applied to a passive optical network (PON).

In the present disclosure, the identifier of the channel is any unique symbol that can represent identity of the channel. For example, the identifier of the channel may be a serial number of the channel. When the serial number of the channel is 1 #, the identifier of the channel indicated in the frame header data unit may be 1 #. Specifically, in the implementation shown in FIG. 2, serial numbers of the channels arranged in sequence from top to bottom are 1 #, 2 #, 3 # and 4 #, respectively.

In order to reduce a size of the frame header data unit, in some implementations, the initial transmitting positions of the channels for transmitting the data units indicated in the frame header data unit include: initial transmitting positions of other channels, for transmitting the data units, except the channel for transmitting the frame header data unit.

In the present disclosure, how to determine the initial transmitting position of each data unit is not particularly limited. In order to shorten an overall time for transmitting the data packet, in some implementations, the multichannel data transmitting method further includes an operation before the operation S130:

operation S110, acquiring the initial transmitting position of each channel.

Correspondingly, in the operation S130, when each data unit is transmitted, the channel with an earliest initial transmitting position in the plurality of channels is taken as the channel for transmitting the data unit.

Currently, if one earliest initial transmitting position exists in the plurality of channels, the channel with the initial transmitting position is configured to transmit a current data unit.

For example, in a certain stage, among channel #1, channel #2, channel #3 and channel #4, channel #1 is the channel with the earliest initial transmitting position, and then channel #1 is configured to transmit a current data unit to be transmitted.

Currently, if a plurality of earliest initial transmitting positions exist in the plurality of channels, in the operation of taking the channel with the earliest initial transmitting position in the plurality of channels as the channel for transmitting the data unit, the channel with the identifier conforming to a predetermined rule is selected as the channel for transmitting a corresponding data unit.

For example, in a certain stage, among channel #1, channel #2, channel #3 and channel #4, channel #1 and channel #2 are the channels with the earliest initial transmitting positions, and then the channel with the identifier satisfying the predetermined rule is to be selected from channel #1 and channel #2 to transmit the corresponding data unit.

In the present disclosure, the predetermined rule is not particularly limited. For example, when the identifier of the channel is the serial number of the channel, the predetermined rule may be that the channel has the smallest serial number, and then channel 1 # may be selected as the channel for transmitting the current data unit; and when the predetermined rule is that the channel has the largest serial number, channel #2 may be selected as the channel for transmitting the current data unit.

In order to enable the receiving terminal to quickly and correctly assemble the data units, in some implementations, the frame header data unit may be transmitted first, and then each pure data unit is transmitted.

The above operations may be used to determine the channel for transmitting the frame header data unit, which is not particularly limited. In some implementations, the channel with the earliest initial transmitting position may be configured to transmit the frame header data unit. That is, when the data is transmitted, the frame header data unit is transmitted first. Accordingly, the receiving terminal receives the frame head data unit first, and the receiving terminal can acquire subsequently transmitted data units through analyzing the frame head data unit, and assemble the data units to obtain complete information.

It should be noted that if one channel with the earliest initial transmitting position exists in the plurality of channels, the channel is taken as the channel for transmitting the frame header data unit.

When a plurality of earliest initial transmitting positions exist in the plurality of channels, the channel with the identifier conforming to the predetermined rule is selected as the channel for transmitting the frame header data unit.

As described above, in the implementation in which the identifier of the channel is the serial number of the channel, the predetermined rule may be that the channel has the smallest serial number, or may be that the channel has the largest serial number.

In the present disclosure, similar to the transmission of the frame header data unit, when the pure data units are transmitted, if one earliest initial transmitting position exists currently, the earliest initial transmitting position is taken as a transmitting position for transmitting a current pure data unit.

When a plurality of earliest initial transmitting positions exist, the channel with the identifier conforming to the predetermined rule is selected as the channel for transmitting the pure data unit.

Before the data packet is transmitted, it is desired to determine data included in the frame header data unit first. Specifically, the multichannel data transmitting method may further include an operation before the operation S130:

operation S120, preprocessing an information segment to be transmitted to obtain the data packet.

The operation S120 may include:

operation S121, generating an initial frame header according to the channel for transmitting the frame header data unit and each channel for transmitting the data unit;

operation S122, calculating a difference between the initial transmitting position of each channel for transmitting the data unit and the initial transmitting position of the channel for transmitting the frame header data unit; and operation S123, adding related initial data to the initial frame header to generate the frame header data unit, with the related initial data including the calculated difference and the identifier of each channel for transmitting the data unit.

It should be noted that not all the channels are configured to transmit the data units. In order to facilitate quickly assembling data by the receiving terminal, in some implementations, the related initial data further includes information of the channel which is not configured to transmit the data unit.

The information may include an identifier of the channel which is not configured to transmit the data unit and a corresponding no-data mark (e.g., may be 0x3F).

As described above, the pure data units may be assembled into an information segment, and in some implementations, the operation S120 may further include:

dividing the information segment to be transmitted into the plurality of pure data units.

Certainly, when the data last remaining, during dividing the information segment, is not enough to form a data unit, the remaining data may be filled to form a complete data unit.

The information to be transmitted may be transmitted in one data packet, or may be transmitted in a plurality of data packets.

In order to improve efficiency of assembling data by the receiving terminal, in some implementations, when differences between the initial transmitting position of the channel for transmitting the frame header data unit and the initial transmitting positions of other channels for transmitting the data unit except the channel for transmitting the frame header data unit are not less than a preset value, the multichannel data transmitting method further includes:

dividing the information to be transmitted into a plurality of information segments; and processing the plurality of information segments into a plurality of data packets; and sequentially transmitting the plurality of data packets for transmitting the data packets.

Various implementations of the multichannel data transmitting method provided by the present disclosure are described in detail below with reference to FIG. 2 to FIG. 6.

In the present disclosure, a format of the frame header is not particularly limited, and the frame header carries at least the above information. For example, in the implementation shown in FIG. 2, the frame header is in a format of a frame header of an XGEM frame. Specifically, as shown in FIG. 2 to FIG. 6, in the frame header (i.e., XGEM header), PLI records a length of transmitted data, and an option field (Options) of the frame header is divided into three parts, each of which has 6 bits and is configured to identify the difference between the initial transmitting position of each channel and the initial transmitting position of the channel for transmitting the frame header data unit.

In the implementation shown in FIG. 2 to FIG. 6, the identifier of the channel is the serial number of the channel, and serial numbers of the channels arranged in sequence from top to bottom are 1 #, 2 #, 3 # and 4 #, respectively.

Through detection, channel 4 # is the channel with the earliest initial transmitting position, a difference between the initial transmitting position of channel 1 # and the initial transmitting position of channel 4 # is 8 data units; a difference between the initial transmitting position of channel 2 # and the initial transmitting position of channel 4 # is 8 data units, and a difference between the initial transmitting position of channel 3 # and the initial transmitting position of channel 4 # is 7 data units.

H represents a frame header data unit, "1" represents a pure data unit 1, and "2" represents a pure data unit 2, and so on.

The information of the frame header data unit H includes PLI, Keyindex, Options, LF and HEC.

Data carried by PLI indicates a length of original data, and the difference between the initial transmitting position of the channel for transmitting the frame header data unit and the initial transmitting position of each channel for transmitting the data unit is written to the option field (Options). In some implementations, the option field is divided into N−1 parts which may be represented by P1, P2 . . . PN−1, respectively. In the present disclosure, a mapping relationship between each part of the option field and each channel is not particularly limited. For example, P1 to PN−1 may respectively represent the differences between the initial transmitting positions of the channels for transmitting the pure data units, which are arranged in sequence according to the serial numbers of the channels, and the initial transmitting position of the channel for transmitting the frame header data unit.

For example, if the frame header data unit is transmitted on channel 1 #, P1 represents a difference between the initial transmitting position of channel 2 # and the initial transmitting position of channel 1 #, P2 represents a difference between the initial transmitting position of channel 3 # and the initial transmitting position of channel 1 #, and P3 represents a difference between the initial transmitting position of channel 4 # and the initial transmitting position of channel 1 #. Similarly, if the frame header data unit is transmitted on channel 2 #, P1 represents a difference between the initial transmitting position of channel 1 # and the initial transmitting position of channel 2 #, P2 represents a difference between the initial transmitting position of channel 3 # and the initial transmitting position of channel 2 #, P3 represents a difference between the initial transmitting position of channel 4 # and the initial transmitting position of channel 2 #, and so on. No more examples are given herein.

In order to carry more information by the frame header, the option field may be divided into N parts, namely P1 to PN, in correspondence with N channels one to one. The correspondence between each part of the option field and each channel is fixed. P1 corresponds to the difference between the initial transmitting position of channel 1 # and the initial transmitting position of the channel for transmitting the frame header data unit; P2 corresponds to the difference between the initial transmitting position of channel 2# and the initial transmitting position of the channel for transmitting the frame header data unit; P3 corresponds to the difference between the initial transmitting position of channel #3 and the initial transmitting position of the channel for transmitting the frame header data unit . . . and so on. If the frame header data unit is transmitted on channel 4 #, P4 is 0. In this way, calculation amount may be reduced when the information of the frame header is set. Accordingly, each part of the option field is relatively small.

In order to carry more information by the frame header, in some implementations, the option field of the frame header may be extended so as to further include the number of the data units transmitted on each channel.

Figure 2:
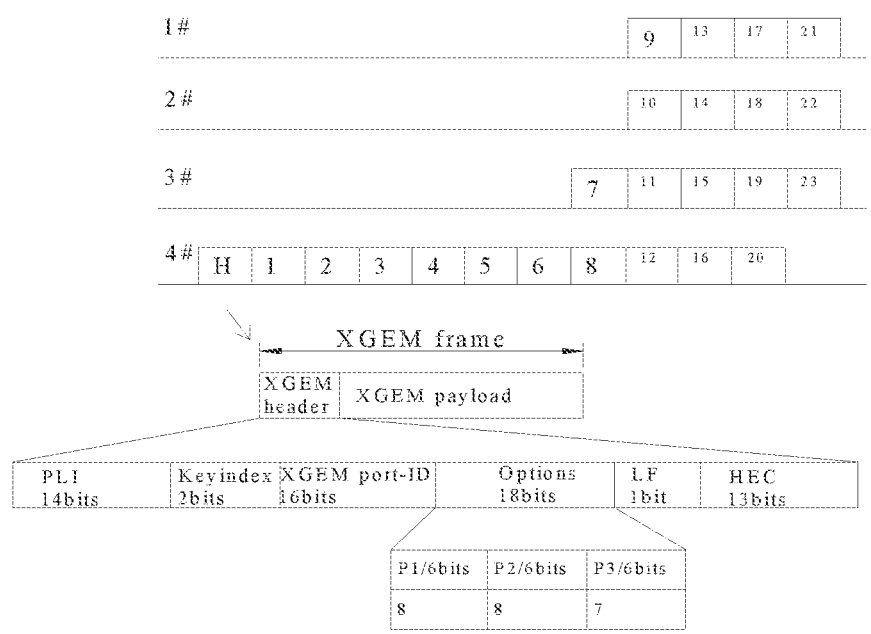
FIG. 2 is a schematic diagram of a first frame format in a multichannel data transmitting method provided by the present disclosure.

In the implementation shown in FIG. 2, the data units are transmitted on 4 channels (i.e., channel 1 #, channel 2 #, channel 3 # and channel 4 #). The data to be transmitted is encapsulated in the format of the XGEM frame. In FIG. 2, H and XGEM header both represent a frame header data unit, and XGEM payload represents a data packet including a plurality of data units.

Channel 4 # has the earliest initial transmitting position, and thus is selected as the channel for transmitting the frame header data unit.

The difference between the initial transmitting position of channel 1 # and the initial transmitting position of channel 4 # is 8 data units (i.e., P1 is 8), the difference between the initial transmitting position of channel 2 # and the initial transmitting position of channel 4 # is 8 data units (i.e., P2 is 8), and the difference between the initial transmitting position of channel 3 # and the initial transmitting position of channel 4 # is 7 data units (i.e., P3 is 7). The length of data is 23 data units. Therefore, an actual length of the data packet is written to PLI, the option field is divided into three parts, namely P1, P2 and P3, and specific values of P1, P2 and P3 are respectively written to the option field to obtain the frame header data unit. Certainly, when the data last remaining, during dividing the information segment, is not enough to form a data unit, the remaining data may be filled to form a complete data unit.

Figure 3:
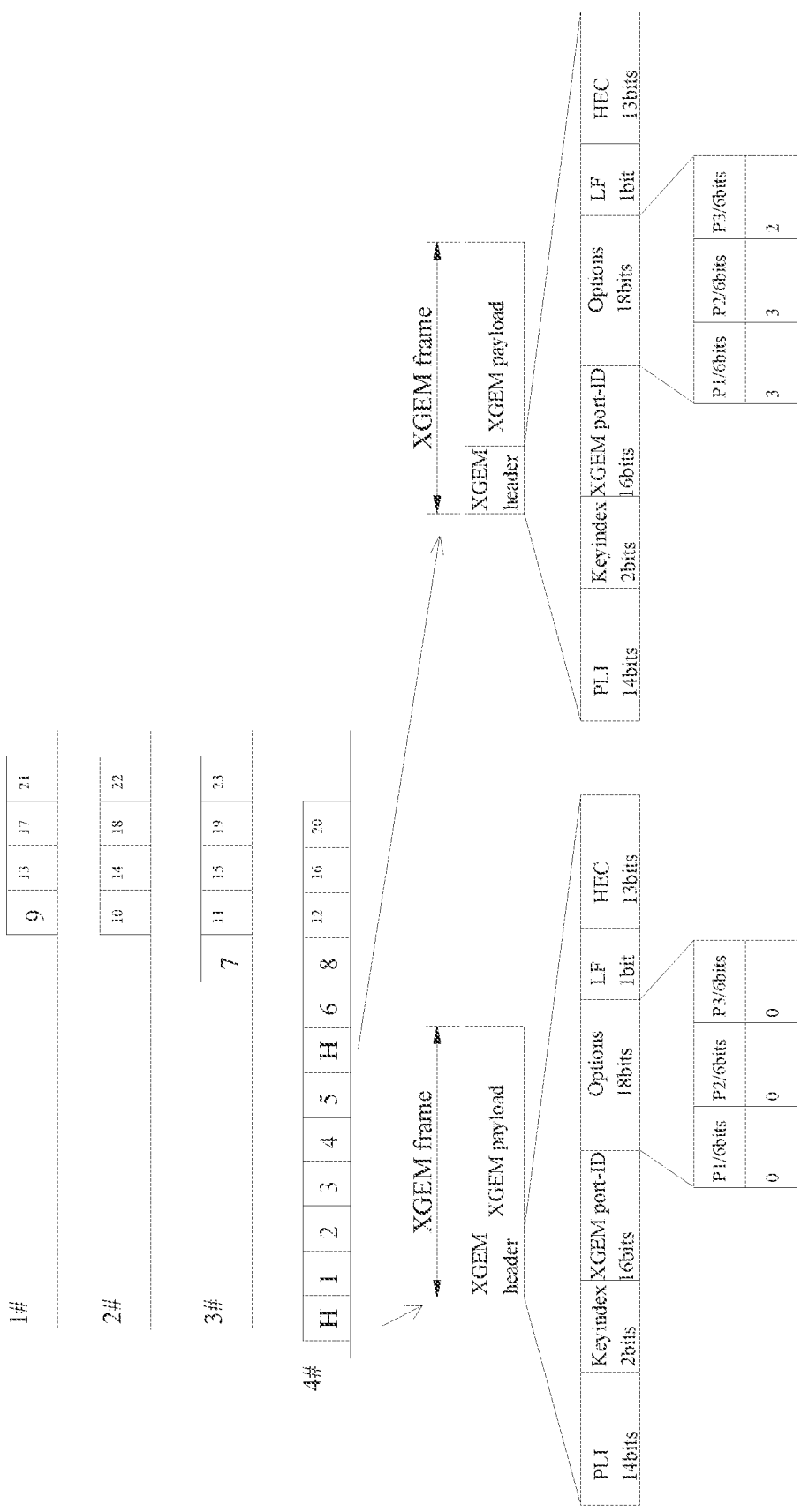
FIG. 3 is a schematic diagram of a second frame format in a multichannel data transmitting method provided by the present disclosure.

In the implementation shown in FIG. 3, the data units are transmitted on 4 channels (i.e., channel 1 #, channel 2 #, channel 3 # and channel 4 #). The data to be transmitted is encapsulated in the format of the XGEM frame. In FIG. 3, both H and XGEM header represent a frame header data unit, and XGEM payload represents a data packet including a plurality of data units. In the implementation shown in FIG. 3, the preset value is 8.

Channel 4 # has the earliest initial transmitting position, and thus is selected as the channel for transmitting the frame header data unit. The difference between the initial transmitting position of channel #4 and the initial transmitting position of channel #1 is 9 data units and exceeds 8 data units, and thus the information to be transmitted is processed into two information segments, and each information segment is processed into a corresponding data packet. The first data packet is transmitted on channel #4 first, and then the other data packet is transmitted. The first data packet includes a frame header data unit, and the second data packet also includes a frame header data unit.

A format of the frame header data unit in the first data packet is the same as that of the frame header data unit in the second data packet. In the specific implementation shown in FIG. 3, a data length of the first data packet is 5 data units, and each part of the option field of the frame header data unit of the first data packet has a value of 0x3F.

In the second data packet, the difference between the initial transmitting position of channel 1 # and the initial transmitting position of channel 4 # is 3 data units (i.e., P1 is 3), the difference between the initial transmitting position of channel 2 # and the initial transmitting position of channel 4 # is 3 data units (i.e., P2 is 3), and the difference between the initial transmitting position of channel 3 # and the initial transmitting position of channel 4 # is 2 data units (i.e., P3 is 2). In the second data packet, a data length is 18 data units. Therefore, an actual length of the data packet is written to PLI, the option field is divided into three parts, namely P1, P2 and P3, and specific values of P1, P2 and P3 are respectively written to the option field to obtain the frame header data unit.

Figure 4:
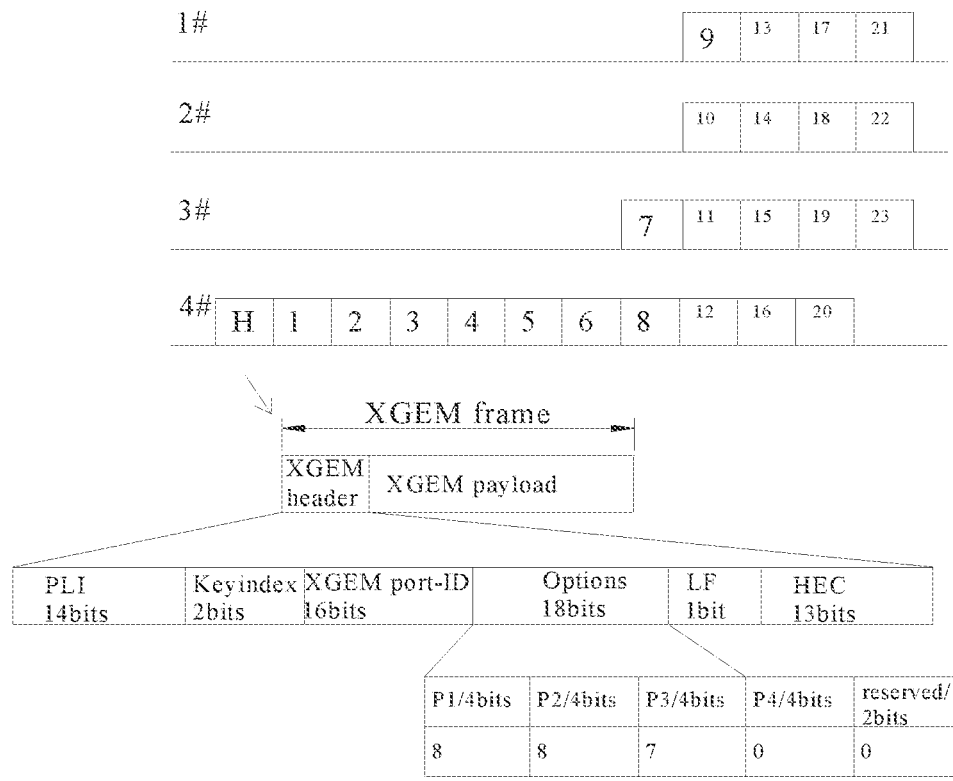
FIG. 4 is a schematic diagram of a third frame format in a multichannel data transmitting method provided by the present disclosure.

In the implementation shown in FIG. 4, a mapping relationship exists between each channel and each part in the option field, that is, the parts in the option field and the channels are mapped to each other one to one. The frame header data unit is transmitted on channel 4 #. In the option field, P1 indicates that the difference between the initial transmitting position of channel 1 # and the initial transmitting position of channel 4 # is 8 data units, P2 indicates that the difference between the initial transmitting position of channel 2 # and the initial transmitting position of channel 4 # is 8 data units, P3 indicates that the difference between the initial transmitting position of channel 3 # and the initial transmitting position of channel 4 # is 7 data units, and P4 indicates that the difference between the initial transmitting position of channel 4 # and the initial transmitting position of channel 4 # is 0 data unit.

Figure 5:
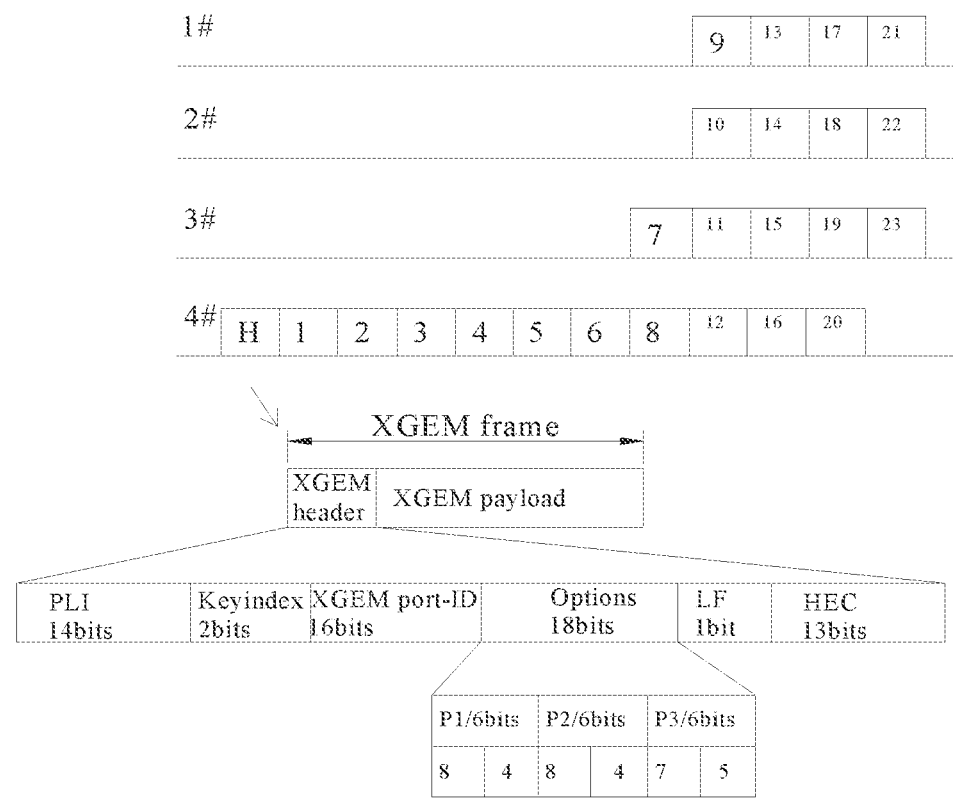
FIG. 5 is a schematic diagram of a fourth frame format in a multichannel data transmitting method provided by the present disclosure.

In the implementation shown in FIG. 5, the option field of the frame header data unit is further extended such that each part of the option field carries two parts of information: one part is the difference between the initial transmitting position of the channel for transmitting the pure data unit and the initial transmitting position of the channel for transmitting the frame header data unit, and the other part is the number of the data units transmitted on the channel. For example, in the implementation shown in FIG. 5, the frame header data unit is transmitted on channel 4 #, P1 indicates that the difference between the initial transmitting position of channel 1 # and the initial transmitting position of channel 4 # is 8 data units, and 4 data units are transmitted on channel 1 #; P2 indicates that the difference between the initial transmitting position of channel 2 # and the initial transmitting position of channel 4 # is 8 data units, and 4 data units are transmitted on channel 2 #; and P3 indicates that the difference between the initial transmitting position of channel 3 # and the initial transmitting position of channel 4 # is 7 data units, and 5 data units are transmitted on channel 3 #.

Figure 6:
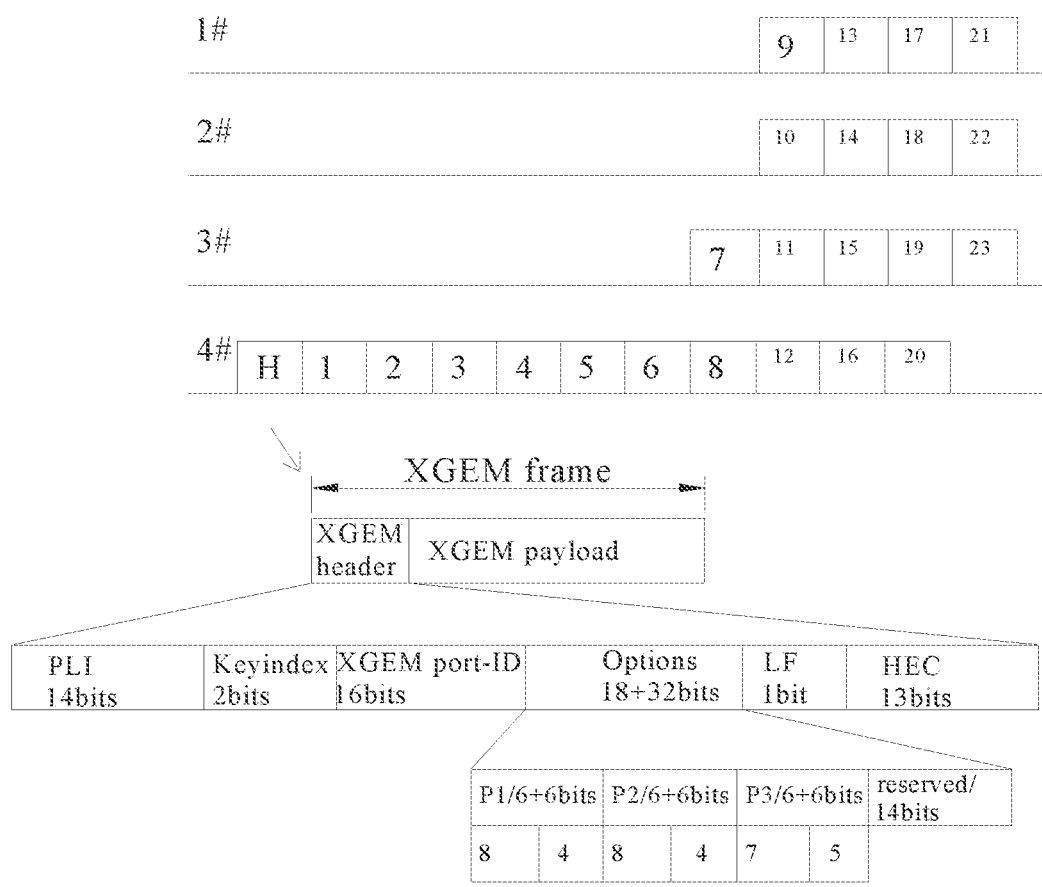
FIG. 6 is a schematic diagram of a fifth frame format in a multichannel data transmitting method provided by the present disclosure.

In the implementation shown in FIG. 6, the option field of the frame header data unit further includes a reserved field of 14 bits, and the remaining parts are similar to those described in the implementation shown in FIG. 5.

Figure 7:
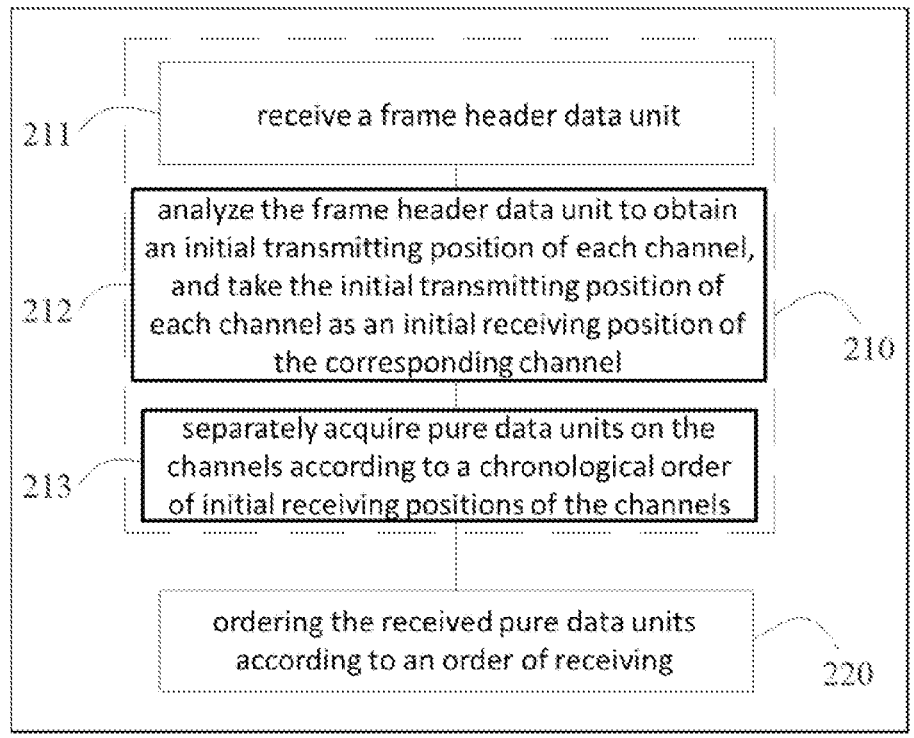
FIG. 7 is a flowchart illustrating a multichannel data receiving method provided by the present disclosure.

In a second aspect of the present disclosure, a multichannel data receiving method for a passive optical network is provided. As shown in FIG. 7, the multichannel data receiving method includes:

operation S210, receiving a plurality of data units of a data packet, with the plurality of data units including a frame header data unit and a plurality of pure data units, and identifiers of channels for transmitting the data units and initial transmitting positions of the channels for transmitting the data units being indicated in the frame header data unit.

The multichannel data receiving method is applied to a receiving terminal. It should be noted that the multichannel data receiving method is used in cooperation with the multichannel data transmitting method.

In the present disclosure, after the frame header data unit is received, the frame header data unit may be analyzed to obtain the initial transmitting positions of other channels, and the data units may be assembled according to the multichannel data receiving method to obtain information. The multichannel data receiving method is described in detail below, and thus is not described in detail here.

In some implementations, when any data unit is received, the channel with an earliest initial transmitting position in a plurality of channels is taken as the channel for receiving the data unit.

In some implementations, when a plurality of earliest initial transmitting positions exist in the plurality of channels, in the operation of taking the channel with the earliest initial transmitting position in the plurality of channels as the channel for receiving the data unit, the channel with the identifier conforming to a predetermined rule is selected as the channel for receiving a corresponding data unit.

As described above, the frame header data unit is transmitted first, and then each pure data unit is transmitted. Correspondingly, in the multichannel data receiving method, the frame header data unit is received first, and then each pure data unit is received.

In some implementations, the operation S210 may include:

operation S211, receiving the frame header data unit;
operation S212, analyzing the frame header data unit to obtain an initial transmitting position of each channel, and taking the initial transmitting position of each channel as an initial receiving position of the corresponding channel; and
operation S213, separately acquiring the pure data units on the channels according to a chronological order of the initial receiving positions of the channels.

In some implementations, the multichannel data receiving method further includes:

operation S220, ordering the received pure data units according to an order of receiving.

After the pure data units are ordered, the pure data units may be assembled to obtain information transmitted from the transmitting terminal.

Figure 8:
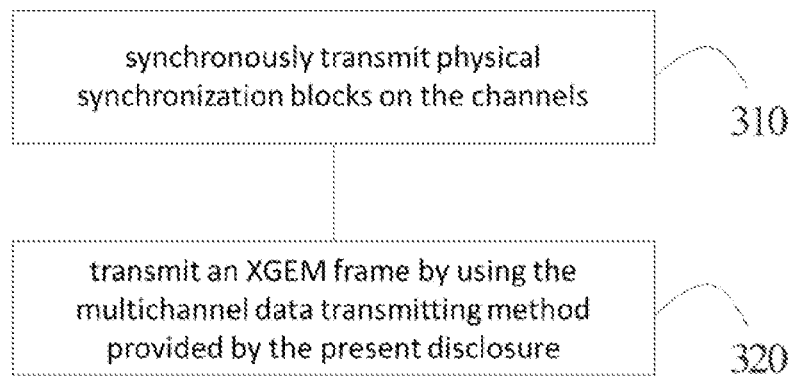
FIG. 8 is a flowchart illustrating a downstream superframe transmitting method provided by the present disclosure.

In a third aspect of the present disclosure, a multichannel downstream superframe transmitting method is provided, and an information field of a downstream superframe includes an XGEM frame. As shown in FIG. 8, the downstream superframe transmitting method includes:

operation S320, transmitting the XGEM frame by using the multichannel data transmitting method provided by the present disclosure, with the XGEM frame including a frame header data unit and a plurality of pure data units. It is noted that the frame header data unit of the XGEM frame has a format similar to those of the frame header data units shown in FIG. 2 to FIG. 6.

Figure 9:
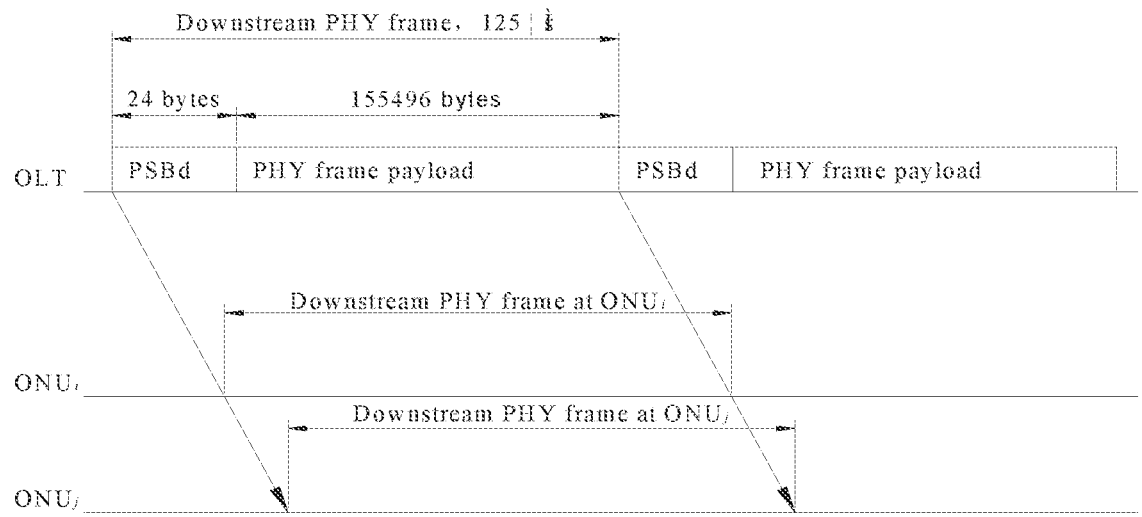
FIG. 9 is a schematic diagram of a data structure in a downstream superframe transmitting method provided by the present disclosure.
Figure 10:
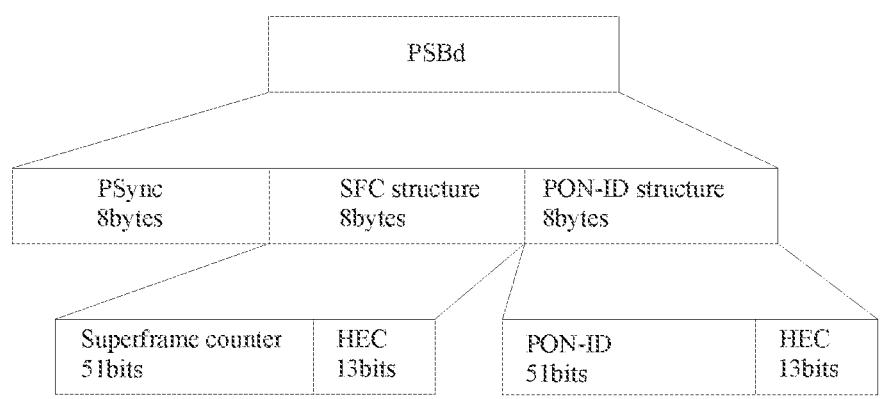
FIG. 10 is a schematic diagram of a data structure of a PSBd.

The multichannel downstream superframe transmitting method provided by the present disclosure may be applied to a passive optical network. Accordingly, the downstream superframe has a data format shown in FIG. 9, and is composed of a physical synchronization block PSBd and a physical frame information field (PHY frame payload), and a data format of the PSBd is shown in FIG. 10. Specifically, the PSBd includes a PSync (with a length of 8 bytes), an SFC structure (with a length of 8 bytes), and a PON-ID structure (with a length of 8 bytes).

Correspondingly, the downstream superframe transmitting method may further include the following operation before the operation S320:

operation S310, synchronously transmitting physical synchronization blocks PSBds on the respective channel.

In the multichannel downstream superframe transmitting method provided by the present disclosure, the PSBd is transmitted on each channel, and the channels transmit the PSBds synchronously. In addition, the synchronously transmitted PSBds have a same superframe counter.

Figure 11:
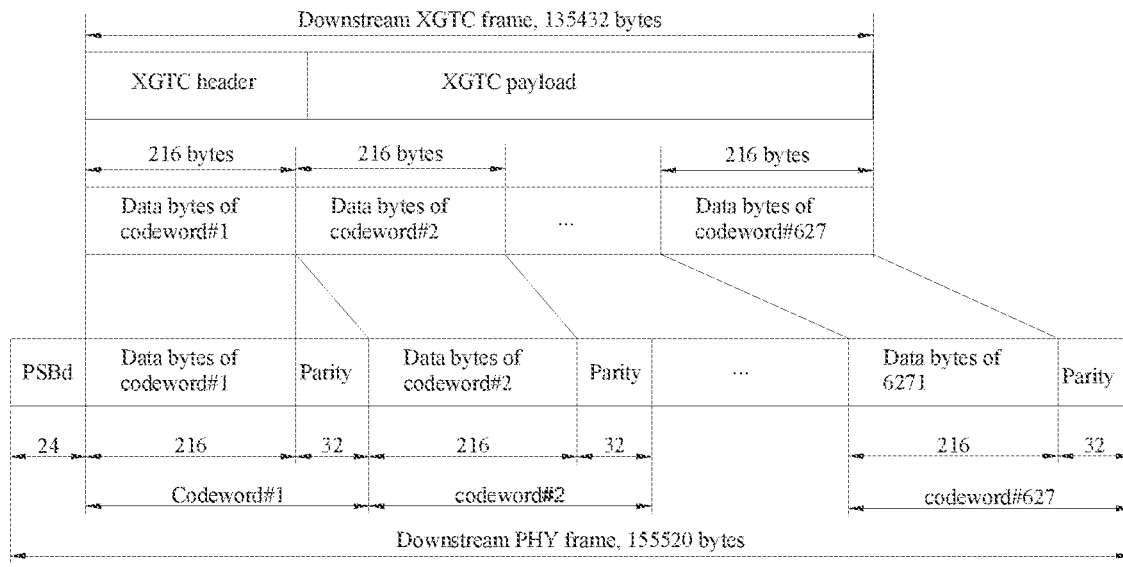
FIG. 11 is a schematic diagram of a data structure after a parity is inserted in a downstream PHY frame.

In addition, as shown in FIG. 11, the PHY frame payload is formed by a downstream XGTC frame with an FEC parity inserted therein.

Figure 12:
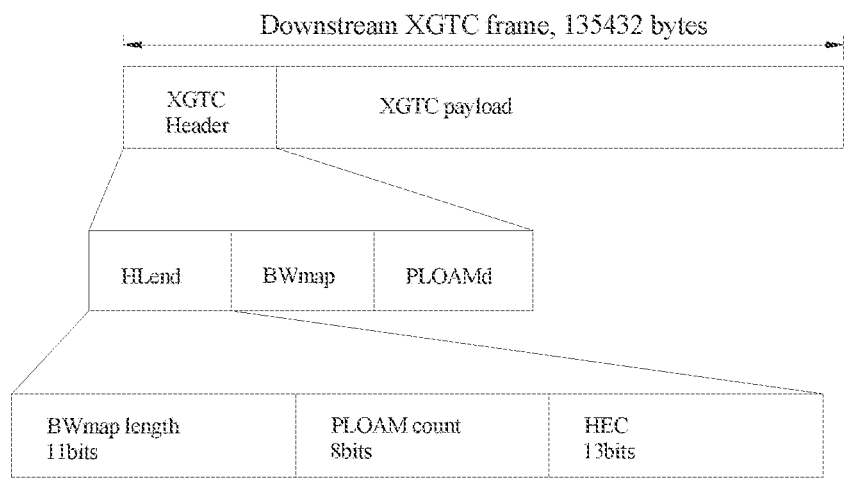
FIG. 12 is a schematic diagram of a data structure of a downstream XGTC frame.
Figure 13:
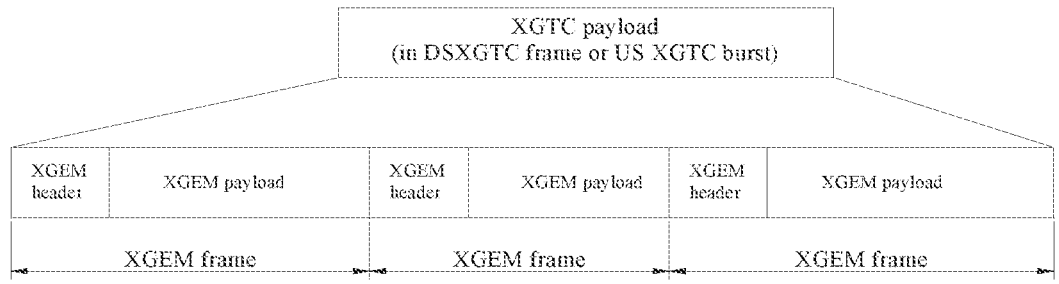
FIG. 13 is a schematic diagram of a data structure of an XGTC information field.

As shown in FIG. 12, the downstream XGTC frame is composed of an XGTC header and an XGTC information field (XGTC payload), the XGTC header is composed of HLend, BWmap (Bandwidth map) and PLOAMd (PLOAM represents Physical Layer Operations Administration and Maintenance), and the HLend is composed of a BWmap length and a PLOAM count, the BWmap length indicates the number of bandwidth allocation entries in the BWmap, and the PLOAM count indicates the number of PLOAM messages in the PLOAMd. As shown in FIG. 13, the XGTC payload is composed of XGEM frames.

Correspondingly, the multichannel downstream superframe transmitting method may further include the following operations before the operation S320:

transmitting the BWmap on each channel; and
transmitting the PLOAMd on each channel.

As shown in FIG. 11, the XGTC payload has a fixed size of 135432 bytes.

The BWmap is transmitted on each channel, and the BWmap transmitted on each channel transmits a bandwidth allocation related to the channel.

The PLOAMd is transmitted on each channel, and the PLOAMd includes a broadcast PLOAM message and a unicast PLOAM message.

Correspondingly, the broadcast PLOAM message is transmitted on each channel, and the channel with an earliest initial transmitting position is selected from the channels supported by an optical network unit (ONU) to transmit the unicast PLOAM message.

Similarly, when the unicast PLOAM message is transmitted, if the channels supported by the ONU include a plurality of channels with the earliest initial transmitting positions, the channel with the identifier conforming to a predetermined rule is selected as the channel for transmitting the unicast PLOAM message.

When the identifier of the channel is a serial number of the channel, the predetermined rule may be that the channel has the smallest serial number or the channel has the largest serial number.

After the BWmap and the PLOAMd for each channel are determined, the HLend for the channel is determined. The BWmap length and the PLOAM count in the HLend for each channel represent the number of bandwidth allocation entries in the BWmap and the number of PLOAM messages in the PLOAMd on each channel, respectively.

After the PSBd field and the HLend field of each channel are determined, a starting point of each channel for transmitting the XGTC payload is determined, and then transmission of the XGEM frame begins. Each XGEM frame is transmitted on the channels supported by a target ONU according to the implementations, and data units obtained by dividing the XGEM frame are distributed and transmitted on the channels as a part of the XGTC payload. FIG. 10 shows a structure of an XGTC frame, and FIG. 13 shows a data structure of an XGTC information field.

After the XGTC payload of each channel is filled with data units, an FEC parity is inserted in the XGTC payload to form a physical frame (PHY frame), and the physical frame is transmitted.

In a fourth aspect of the present disclosure, a multichannel downstream superframe receiving method is provided, and an information field of a downstream superframe includes an XGEM frame. The multichannel downstream superframe receiving method includes:

receiving the XGEM frame by using the multichannel data receiving method provided by the present disclosure, with the XGEM frame including a frame header data unit and a plurality of pure data units.

In some implementations, the downstream superframe receiving method, applied to a passive optical network, includes that:

receiving PSBds with a same superframe counter on channels supported by an ONU, the channels each take the PSBds as a common receiving start point, and then performing FEC verification or error correction, to obtain an XGTC header; analyzing to obtain corresponding BWmap and PLOAMd according to an HLend, so as to obtain a start point of receiving XGTC payload on each channel, then receiving the XGEM frame, and assembling received data units according to an assembling method provided by the present disclosure.

Figure 14:
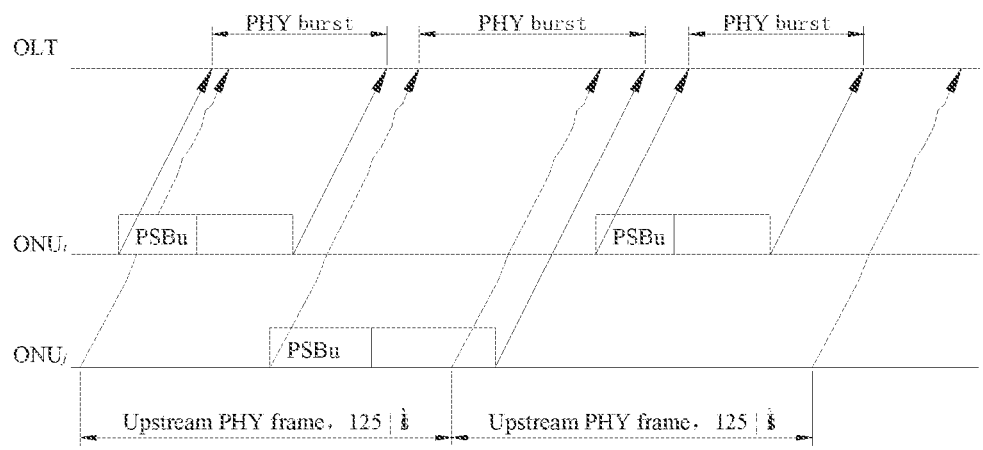
FIG. 14 is a schematic diagram of a data structure in an upstream superframe transmitting method provided by the present disclosure.
Figure 15:
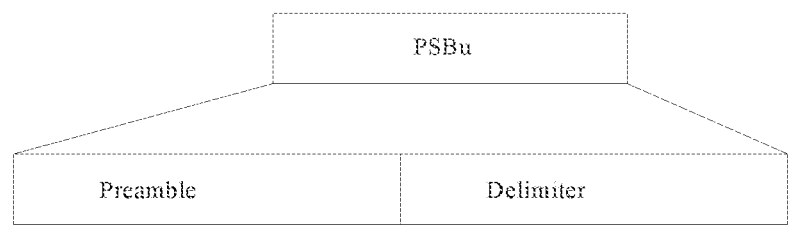
FIG. 15 is a schematic diagram of a data structure of a PSBu.
Figure 16:
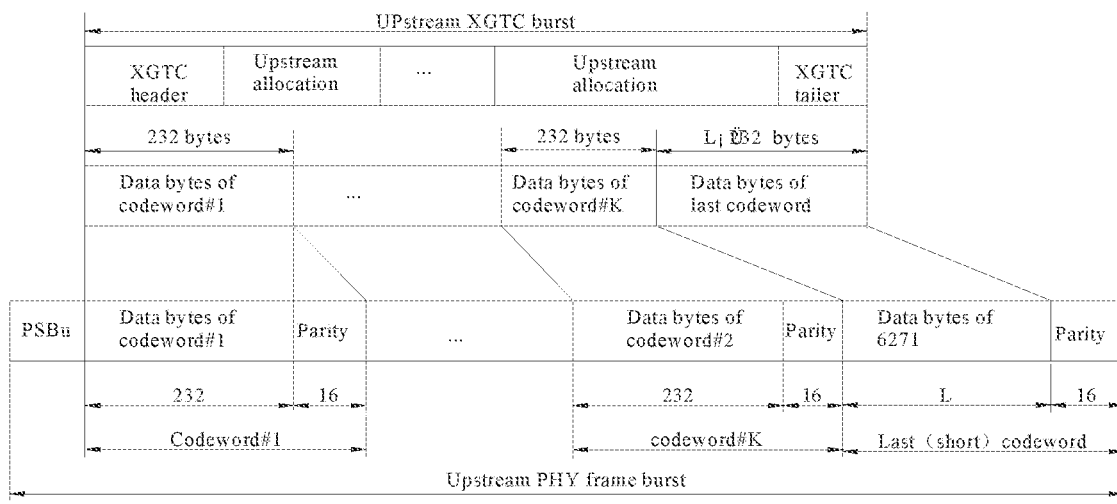
FIG. 16 is a schematic diagram of an upstream transmitted data structure after an FEC parity is inserted.
Figure 17:
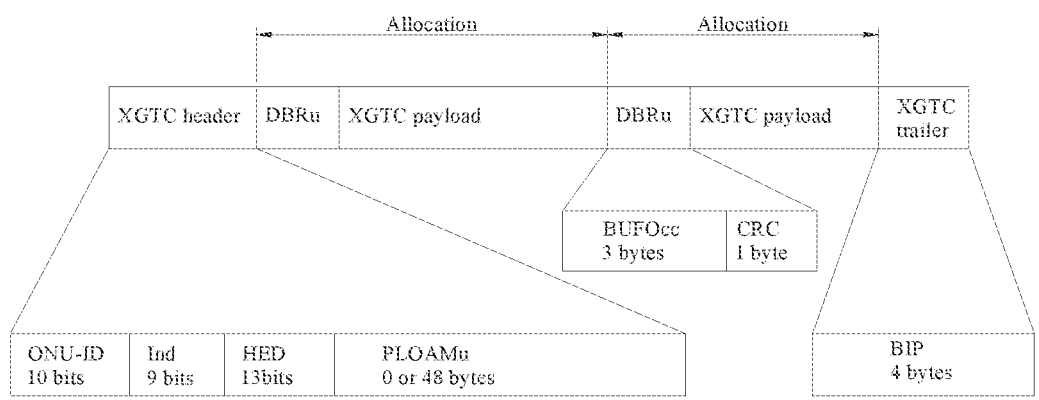
FIG. 17 is a schematic diagram of a data structure of an upstream XGTC frame.

In addition, the multichannel data transmitting method provided by the present disclosure may be configured to transmit an upstream superframe. FIG. 14 shows a data structure of an existing upstream superframe. The upstream superframe is an upstream physical frame burst (PHY burst) and is composed of a physical frame header (PHY frame header) (i.e., PSBu as shown in FIG. 15) and a physical frame information field (PHY frame payload). When the upstream superframe has an FEC, the PHY frame payload is shown in FIG. 16 and is composed of an upstream XTGC burst with an FEC parity inserted therein; and when no FEC is provided, the PHY frame payload is directly composed of the upstream XGTC burst. The upstream XGTC burst/frame is shown in FIG. 17.

Figure 18:
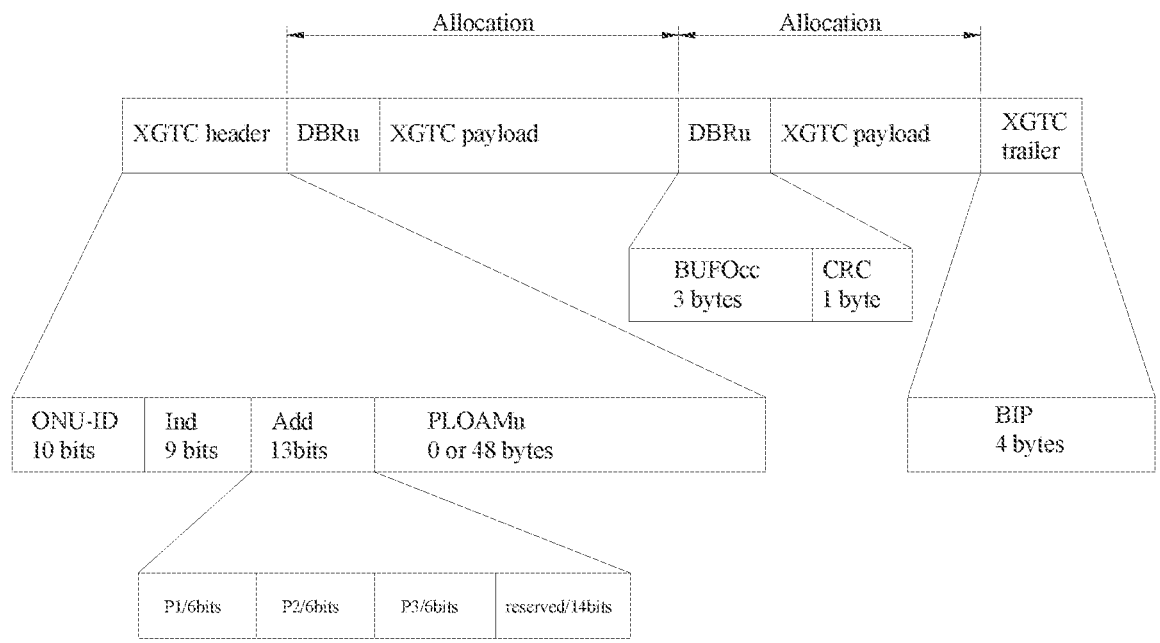
FIG. 18 is a schematic diagram of a data structure of a modified upstream XGTC frame.

Specifically, when the upstream superframe is transmitted by using the multichannel data transmitting method provided by the present disclosure, as shown in FIG. 18, an Add field of 32 bits is inserted between an HEC and a PLOAMu of the existing upstream superframe and includes three fields, namely P1, P2 and P3, and a reserved field. The Add field corresponds to the option field described above in the present disclosure.

The ONU acquires channels allocated with bandwidth, sends the PSBu on each channel, and acquires a start time of data transmission of each channel, so as to generate an XGTC frame. Each data unit has 8 bytes and is transmitted to the channel according to an earliest/minimum principle. The fields of ONU-ID, Ind, Add and HEC in the XGTC header just constitute one data unit, and P1, P2 and P3 in the Add field support transmission on other channels.

Reception and assembly of the upstream superframe on the channel are described below:

an Optical Line Terminal (OLT) first analyzes the PSBu on the channel, allocated with the bandwidth, of the ONU, and then receives a first data unit, which includes an ONU-ID, an Ind, an Add and an HEC, according to the earliest/minimum principle. After the Add field is analyzed, the data unit is received on the corresponding channel according to P1, P2 and P3 and the earliest/minimum principle, and then the XGTC frame is assembled.

Figure 19:
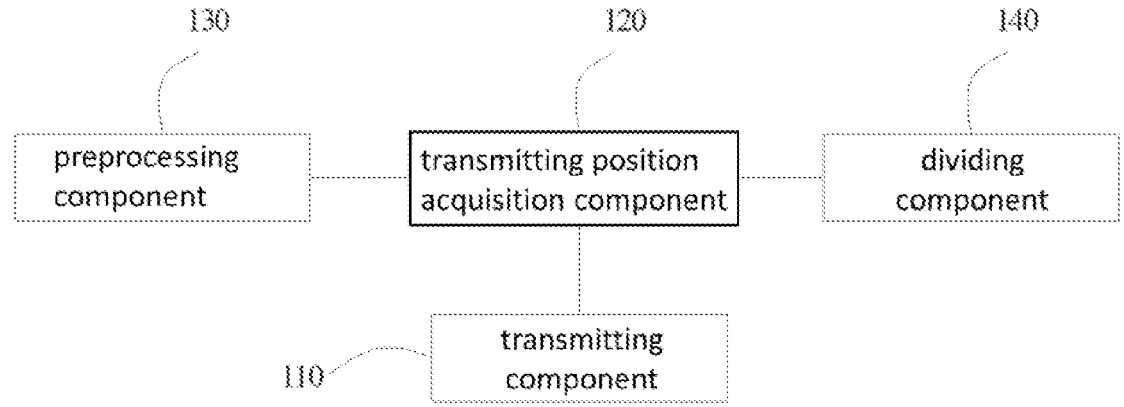
FIG. 19 is a block diagram of a multichannel data transmitting apparatus provided by the present disclosure.

In a fifth aspect of the present disclosure, a multichannel data transmitting apparatus for a passive optical network is provided. As shown in FIG. 19, the multichannel data transmitting apparatus includes a transmitting component 110 configured to transmit a data packet, which includes a plurality of data units including a frame header data unit and a plurality of pure data units, that is, the transmitting component is configured to transmit the plurality of data units, and transmit the frame header data unit on one of the plurality of channels, and identifiers of channels for transmitting the data units and initial transmitting positions of the channels for transmitting the data units are indicated in the frame header data unit.

The multichannel data transmitting apparatus is configured to perform the multichannel data transmitting method provided by the present disclosure. The beneficial effects and the operating principle of the multichannel data transmitting method are described in detail above, and thus are not repeated here.

In some implementations, the multichannel data transmitting apparatus further includes a transmitting position acquisition component 120 configured to acquire the initial transmitting position of each channel.

In some implementations, the multichannel data transmitting apparatus further includes a preprocessing component 130 configured to preprocess an information segment to be transmitted to obtain a data packet. Specifically, the preprocessing component is configured to:
  generate an initial frame header according to the channel for transmitting the frame header data unit and each channel for transmitting the data unit;
  calculate a difference between the initial transmitting position of each channel for transmitting the data unit and the initial transmitting position of the channel for transmitting the frame header data unit; and
  add related initial data to the initial frame header to generate the frame header data unit, with the related initial data including the calculated difference, and the identifier of each channel for transmitting the data unit.

In some implementations, the preprocessing component 130 is further configured to divide the information segment to be transmitted into the plurality of pure data units.

In some implementations, the multichannel data transmitting apparatus further includes a dividing component 140 configured to divide the information to be transmitted into a plurality of information segments when differences between the initial transmitting position of the channel for transmitting the frame header data unit and the initial transmitting positions of other channels for transmitting the data unit except the channel for transmitting the frame header data unit are not less than a preset value.

Figure 20:
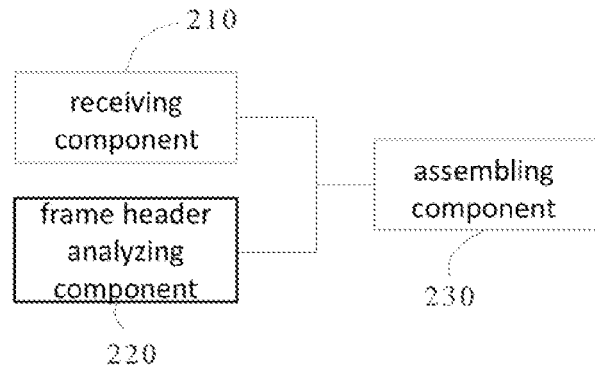
FIG. 20 is a block diagram of a multichannel data receiving apparatus provided by the present disclosure.

In a sixth aspect of the present disclosure, a multichannel data receiving apparatus for a passive optical network is provided. As shown in FIG. 20, the multichannel data receiving apparatus includes a receiving component 210 configured to receive a data packet, which includes a plurality of data units including a frame header data unit and a plurality of pure data units, that is, the receiving component is configured to receive the plurality of data units, and identifiers of channels for transmitting the data units and initial transmitting positions of the channels for transmitting the data units are indicated in the frame header data unit.

The multichannel data receiving apparatus is configured to perform the multichannel data receiving method provided by the present disclosure. The advantages and the beneficial effects of the multichannel data receiving method are described in detail above, and thus are not repeated here.

In some implementations, the multichannel data receiving apparatus further includes a frame header analyzing component 220 configured to analyze the frame header data unit to obtain an initial transmitting position of each channel, and take the initial transmitting position of each channel as an initial receiving position of a corresponding channel.

The receiving component 210 is further configured to separately acquire the pure data units on the channels according to a chronological order of initial receiving positions of the channels.

The multichannel data receiving apparatus may further include an assembling component 230 configured to ordering the received pure data units according to an order of receiving.

In a seventh aspect of the present disclosure, there is provided a computer-readable storage medium having an executable program stored therein.

When the executable program is executed by a processor, the multichannel data transmitting method or the multichannel data receiving method provided by the present disclosure is performed.

The computer-readable storage medium includes volatile/nonvolatile and removable/non-removable medium used in any method or technology for storing information (such as computer-readable instructions, data structures, program modules and other data). The computer-readable storage medium includes, but is not limited to, a Random Access Memory (RAM), a Read-Only Memory (ROM), an Electrically Erasable Programmable Read-Only Memory (EEPROM), a flash memory or other memories, a Compact Disc Read-Only Memory (CD-ROM), a Digital Video Disk (DVD) or other optical discs, a magnetic cassette, a magnetic tape, a magnetic disk or other magnetic storage devices, or any other medium which can be used to store the desired information and can be accessed by a computer.

In an eighth aspect of the present disclosure, an electronic device is provided, and the electronic device includes:
  one or more processors; and
  a storage device having one or more programs stored therein, when the one or more programs are executed by the one or more processors,
  the one or more processors perform the multichannel data transmitting method, or the multichannel data receiving method provided by the present disclosure.

It should be understood that the above implementations are merely exemplary implementations that are employed to illustrate the principles of the present disclosure, and the present disclosure is not limited thereto. Various changes and modifications may be made by those of ordinary skill in the art without departing from the spirit and essence of the present disclosure, and should be considered as falling within the protection scope of the present disclosure.

What is claimed is:

1. A multichannel data transmitting method, comprising:
  transmitting a plurality of data units of a data packet, wherein the plurality of data units comprise one frame header data unit and a plurality of pure data units, and transmitting the frame header data unit in the plurality of data units comprises:
  transmitting the frame header data unit on one of a plurality of channels, wherein identifiers of channels for transmitting the data units and initial transmitting positions of the channels for transmitting the data units are indicated in the frame header data unit, wherein the initial transmitting positions of the channels for transmitting the data units indicated in the frame header data unit comprises: initial transmitting positions of other channels for transmitting the data units, except the channel for transmitting the frame header data unit.

2. The multichannel data transmitting method of claim 1, before transmitting the plurality of data units of the data packet, further comprising:
acquiring the initial transmitting position of each channel of the plurality of channels; and
selecting a channel with an earliest initial transmitting position from the plurality of channels, wherein the channel with the earliest initial transmitting position is used for transmitting a data unit of the plurality of data units of the data packet during transmitting the plurality of data units.

3. The multichannel data transmitting method of claim 2, wherein, in response to that a plurality of earliest initial transmitting positions exist in the plurality of channels, taking the channel with the earliest initial transmitting position in the plurality of channels as the channel for transmitting the data unit comprises selecting the channel with an identifier conforming to a predetermined rule as the channel for transmitting each corresponding data unit.

4. The multichannel data transmitting method of claim 2, wherein transmitting the plurality of data units of the data packet comprises transmitting the frame header data unit first, and then transmitting each pure data unit.

5. The multichannel data transmitting method of claim 4, before transmitting the plurality of data units of the data packet, further comprising:
preprocessing a information segment to be transmitted to obtain the data packet, which comprises:
generating an initial frame header according to the channel for transmitting the frame header data unit and each channel for transmitting the data unit;
calculating a difference between the initial transmitting position of each channel for transmitting the data unit and the initial transmitting position of the channel for transmitting the frame header data unit; and
adding related initial data to the initial frame header to generate the frame header data unit, wherein the related initial data comprises the calculated difference and an identifier of each channel for transmitting the data unit.

6. The multichannel data transmitting method of claim 5, wherein the related initial data further comprises information of the channel which is not configured to transmit the data unit.

7. The multichannel data transmitting method of claim 5, wherein preprocessing the information segment to be transmitted to obtain the data packet further comprises:
dividing the information segment to be transmitted into the plurality of pure data units.

8. The multichannel data transmitting method of claim 1, in response to that differences between the initial transmitting position of the channel for transmitting the frame header data unit and the initial transmitting positions of other channels for transmitting the data units, except the channel for transmitting the frame header data unit, are not less than a preset value, further comprising:
dividing information to be transmitted into a plurality of information segments; and
processing the plurality of information segments into the plurality of data packets; wherein the plurality of data packets are sequentially transmitted for transmitting the data packets.

9. A multichannel downstream superframe transmitting method, wherein an information field of a downstream superframe comprises an XGEM frame, and the downstream superframe transmitting method comprises:
transmitting the XGEM frame by using the multichannel data transmitting method of claim 1, with the XGEM frame comprising a frame header data unit and a plurality of pure data units.

10. The multichannel downstream superframe transmitting method of claim 9, wherein the downstream superframe further comprises a physical synchronization block PSBd and a physical frame information field, the physical frame information field comprises the XGEM frame, and the physical frame information field comprises a downstream XGTC frame, the downstream XGTC frame comprises a bandwidth map BWmap and Physical Layer Operations Administration and Maintenance information PLOAMd, and before transmitting the XGEM frame, the downstream superframe transmitting method further comprises:
synchronously transmitting physical synchronization blocks on the channels;
transmitting the BWmap on each channel; and
transmitting the PLOAMd on each channel.

11. The multichannel downstream superframe transmitting method of claim 10, wherein, for transmistting the BWmap on each channel, the BWmap transmitted on each channel transmits a bandwidth allocation related to the channel.

12. The multichannel downstream superframe transmitting method of claim 10, wherein the PLOAMd comprises a broadcast PLOAM message and a unicast PLOAM message, and
transmitting the PLOAMd on each channel comprises:
transmitting the broadcast PLOAM message on each channel; and
selecting the channel with an earliest initial transmitting position from channels supported by an optical network unit (ONU) to transmit the unicast PLOAM message.

13. The downstream superframe transmitting method of claim 12, wherein, for transmitting the unicast PLOAM message, in response to that the channels supported by the ONU comprise multiple ones having the earliest initial transmitting positions, the channel with an identifier conforming to a predetermined rule is selected as the channel for transmitting the unicast PLOAM message.

14. A multichannel data receiving method, comprising:
receiving a plurality of data units of a data packet, wherein the plurality of data units comprise one frame header data unit and a plurality of pure data units, the frame header data unit being transmitted on one of a plurality of channels, and identifiers of channels for transmitting the data units and initial transmitting positions of the channels for transmitting the data units are indicated in the frame header data unit,
wherein the initial transmitting positions of the channels for transmitting the data units indicated in the frame header data unit comprises: initial transmitting positions of other channels for transmitting the data units, except the channel for transmitting the frame header data unit.

15. The multichannel data receiving method of claim 14, before receiving the plurality of data units of the data packet, further comprising:
acquiring an initial receiving position of each channel of the plurality of channels; and
wherein a channel with an earliest initial transmitting position from the plurality of channels is used for receiving a data unit of the plurality of data units of the data packet during receiving the plurality of data units.

16. The multichannel data receiving method of claim 15, wherein, in response to that a plurality of current earliest initial receiving positions exist in the plurality of channels, taking the channel with the earliest initial receiving position in the plurality of channels as the channel for receiving the data unit comprises selecting the channel with an identifier conforming to a predetermined rule as the channel for receiving each corresponding data unit.

17. The multichannel data receiving method of claim 15, wherein the frame header data unit is received first, and then each pure data unit is received.

18. The multichannel data receiving method of claim 17, wherein receiving the plurality of data units of the data packet comprises:
   receiving the frame header data unit;
   analyzing the frame header data unit to obtain the initial transmitting position of each channel, and taking the initial transmitting position of each channel as the initial receiving position of each corresponding channel; and
   separately acquiring the pure data units on the channels according to a chronological order of the initial receiving positions of the channels;
   wherein the multichannel data receiving method further comprises:
   ordering the received pure data units according to an order of receiving.

19. A multichannel downstream superframe receiving method, wherein an information field of a downstream superframe comprises an XGEM frame, and the multichannel downstream superframe receiving method comprises:
   receiving the XGEM frame by using the multichannel data receiving method of claim 10, with the XGEM frame comprising a header data unit and a plurality of pure data units.

20. A multichannel data transmitting method, comprising:
   transmitting a plurality of data units of a data packet, wherein the plurality of data units comprise one frame header data unit and a plurality of pure data units, and transmitting the frame header data unit in the plurality of data units comprises:
   transmitting the frame header data unit on one of a plurality of channels, wherein identifiers of channels for transmitting the data units and initial transmitting positions of the channels for transmitting the data units are indicated in the frame header data unit, wherein in response to that differences between the initial transmitting position of the channel for transmitting the frame header data unit and the initial transmitting positions of other channels for transmitting the data units, except the channel for transmitting the frame header data unit, are not less than a preset value, the method further comprises:
   dividing information to be transmitted into a plurality of information segments; and
   processing the plurality of information segments into the plurality of data packets; wherein the plurality of data packets are sequentially transmitted for transmitting the data packets.

* * * * *